(12) United States Patent
Lee et al.

(10) Patent No.: US 8,265,000 B2
(45) Date of Patent: Sep. 11, 2012

(54) METHOD FOR RECEIVING COMMON CHANNEL IN WIRELESS COMMUNICATION AND TERMINAL THEREOF

(75) Inventors: Young-Dae Lee, Gyeonggi-Do (KR); Sung-Duck Chun, Gyeonggi-Do (KR); Sung-Jun Park, Gyeonggi-Do (KR); Seung-June Yi, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 469 days.

(21) Appl. No.: 12/521,747

(22) PCT Filed: Jan. 8, 2008

(86) PCT No.: PCT/KR2008/000101
§ 371 (c)(1), (2), (4) Date: Jun. 29, 2009

(87) PCT Pub. No.: WO2008/084957
PCT Pub. Date: Jul. 17, 2008

(65) Prior Publication Data
US 2010/0040002 A1 Feb. 18, 2010

Related U.S. Application Data

(60) Provisional application No. 60/884,009, filed on Jan. 8, 2007, provisional application No. 60/884,401, filed on Jan. 10, 2007.

(51) Int. Cl.
*H04Q 7/00* (2006.01)
*H04L 12/28* (2006.01)

(52) U.S. Cl. .................... 370/314; 370/328; 370/389

(58) Field of Classification Search .................. None
See application file for complete search history.

(56) References Cited

U.S. PATENT DOCUMENTS

| | | |
|---|---|---|
| 6,470,391 B2 | 10/2002 | Takamoto et al. |
| 6,665,313 B1 | 12/2003 | Chang et al. |
| 6,697,347 B2 | 2/2004 | Ostman et al. |
| 6,778,501 B1 | 8/2004 | Malmgren et al. |
| 7,006,464 B1 | 2/2006 | Gopalakrishnan et al. |
| 7,158,504 B2 | 1/2007 | Kadaba et al. |

(Continued)

FOREIGN PATENT DOCUMENTS

EP     1432261     6/2004

(Continued)

OTHER PUBLICATIONS

3rd Generation Partnership Project (3GPP), "Universal Mobile Telecommunications System (UMTS); User Equipment (UE) Procedures in Idle Mode and Procedures for Cell Reselection in Connected Mode (Release 7)," ETSI TS 125 304, v7.1.0, Dec. 2006, XP-014039981.

(Continued)

*Primary Examiner* — Yemane Mesfin
*Assistant Examiner* — Christine Duong
(74) *Attorney, Agent, or Firm* — Lee, Hong, Degerman, Kang & Waimey

(57) ABSTRACT

A method for receiving a common channel of a mobile terminal is disclosed. The mobile terminal receives a shared control channel, determines whether to receive a shared data channel or a common channel, and receives the shared data channel or the common channel according to control information transmitted via the shared control channel.

5 Claims, 13 Drawing Sheets

U.S. PATENT DOCUMENTS

| | | | |
|---|---|---|---|
| 7,295,573 | B2 | 11/2007 | Yi et al. |
| 7,359,924 | B2 | 4/2008 | Balachandran et al. |
| 7,542,457 | B2 | 6/2009 | Wu |
| 7,646,742 | B2 | 1/2010 | Petrovic et al. |
| 7,764,661 | B2 | 7/2010 | Heo et al. |
| 7,801,563 | B2 * | 9/2010 | Hara et al. ............... 455/562.1 |
| 7,912,471 | B2 | 3/2011 | Kodikara Patabandi et al. |
| 2002/0170013 | A1 | 11/2002 | Bolourchi et al. |
| 2002/0174276 | A1 | 11/2002 | Jiang |
| 2003/0040314 | A1 | 2/2003 | Hogan et al. |
| 2003/0095519 | A1 | 5/2003 | Kuo et al. |
| 2003/0157953 | A1 | 8/2003 | Das et al. |
| 2003/0181221 | A1 | 9/2003 | Nguyen |
| 2003/0189912 | A1 | 10/2003 | Laitinen et al. |
| 2003/0210669 | A1 | 11/2003 | Vayanos et al. |
| 2003/0214935 | A1 | 11/2003 | Khan et al. |
| 2003/0231612 | A1 | 12/2003 | Kim et al. |
| 2004/0103435 | A1 | 5/2004 | Yi et al. |
| 2004/0228294 | A1 | 11/2004 | Kim et al. |
| 2004/0266461 | A1 | 12/2004 | Beckmann et al. |
| 2005/0083943 | A1 | 4/2005 | Lee et al. |
| 2005/0111487 | A1 | 5/2005 | Matta et al. |
| 2005/0207343 | A1 * | 9/2005 | Han, II ........................ 370/235 |
| 2005/0220116 | A1 | 10/2005 | Ahn et al. |
| 2005/0237960 | A1 | 10/2005 | Kim |
| 2006/0018294 | A1 * | 1/2006 | Kynaslahti et al. ........... 370/338 |
| 2006/0092911 | A1 | 5/2006 | Hwang et al. |
| 2006/0092973 | A1 | 5/2006 | Petrovic et al. |
| 2006/0114877 | A1 | 6/2006 | Heo et al. |
| 2006/0140158 | A1 | 6/2006 | Terry |
| 2006/0148411 | A1 | 7/2006 | Cho et al. |
| 2006/0152083 | A1 | 7/2006 | Fuhr et al. |
| 2006/0203760 | A1 | 9/2006 | Fukui et al. |
| 2006/0245386 | A1 | 11/2006 | Hu |
| 2006/0251019 | A1 | 11/2006 | Dalsgaard et al. |
| 2006/0251105 | A1 | 11/2006 | Kim et al. |
| 2007/0047452 | A1 | 3/2007 | Lohr et al. |
| 2007/0064602 | A1 | 3/2007 | Jiang |
| 2007/0091810 | A1 | 4/2007 | Kim et al. |
| 2007/0254679 | A1 | 11/2007 | Montojo et al. |
| 2007/0293222 | A1 | 12/2007 | Vikberg et al. |
| 2008/0045272 | A1 | 2/2008 | Wang et al. |
| 2008/0056148 | A1 | 3/2008 | Wu |
| 2008/0056183 | A1 | 3/2008 | Gorokhov et al. |
| 2008/0084844 | A1 * | 4/2008 | Reznik et al. ................. 370/330 |
| 2008/0101270 | A1 | 5/2008 | Kekki et al. |
| 2008/0101280 | A1 | 5/2008 | Gholmieh et al. |
| 2008/0117891 | A1 | 5/2008 | Damnjanovic et al. |
| 2008/0165724 | A1 | 7/2008 | Wu et al. |
| 2008/0165755 | A1 * | 7/2008 | Marinier et al. .............. 370/342 |
| 2008/0273610 | A1 | 11/2008 | Malladi et al. |
| 2009/0028123 | A1 | 1/2009 | Terry et al. |
| 2009/0221293 | A1 | 9/2009 | Petrovic et al. |
| 2009/0268676 | A1 * | 10/2009 | Wigard et al. ................ 370/329 |
| 2010/0091721 | A1 | 4/2010 | Larmo et al. |
| 2011/0190001 | A1 | 8/2011 | Kodikara Patabandi et al. |

FOREIGN PATENT DOCUMENTS

| | | |
|---|---|---|
| EP | 1724948 | 11/2006 |
| EP | 1755355 | 2/2007 |
| EP | 1843504 | 4/2007 |
| EP | 1845649 | 10/2007 |
| EP | 1845650 | 10/2007 |
| JP | 2002-247042 | 8/2002 |
| JP | 2002527945 | 8/2002 |
| JP | 2002-290413 | 10/2002 |
| JP | 2003-304574 | 10/2003 |
| JP | 2005-525065 | 8/2005 |
| JP | 2006-121394 | 5/2006 |
| JP | 2006-148490 | 6/2006 |
| JP | 2006-237897 | 9/2006 |
| JP | 2006-524444 | 10/2006 |
| JP | 2006524969 | 11/2006 |
| JP | 2006-352708 | 12/2006 |
| JP | 2009535957 | 10/2009 |
| RU | 2280327 | 7/2006 |
| RU | 2322765 | 4/2008 |
| WO | 97/11566 | 3/1997 |
| WO | 98/24250 | 6/1998 |
| WO | 02/093296 | 11/2002 |
| WO | 03/085874 | 10/2003 |
| WO | 03/096149 | 11/2003 |
| WO | 03/096567 | 11/2003 |
| WO | 2005/119941 | 12/2005 |
| WO | 2005/125252 | 12/2005 |
| WO | 2006/022876 | 3/2006 |
| WO | 2006/105333 | 10/2006 |
| WO | 2006/118418 | 11/2006 |

OTHER PUBLICATIONS

3rd Generation Partnership Project (3GPP), "Universal Mobile Telecommunications System (UMTS); High Speed Downlink Packet Access (HSDPA); Overall Description; Stage 2 (Release 7)," ETSI TS 125 308, v7.1.0, Dec. 2006, XP-014039997.

Samsung, "DL Control Channel Structure: Overview," 3GPP TSG RAN WG1 Meeting #46 bis, R1-062534, Oct. 9, 2006.

Ericsson, "E-UTRA Downlink Control Signaling-Open Issues," TSG-RAN WG1#45, R1-061365, May 8, 2006.

Motorola, "Report of E-Mail Discussion: DL Scheduling," TSG-RAN WG2, R2-063684, Dec. 2, 2006.

LG Electronics, "Downlink Control Signaling," 3GPP TSG RAN WG1 #47, R1-063177, Nov. 6, 2006.

Texas Instruments, "Control Channel Structure and Coding in E-UTRA Downlink," 3GPP TSG RAN WG 1#47, R1-063220, Nov. 6, 2006.

Sharp, "UE Identity in L1/L2 Control Signalling for Downlink Scheduling Resource Allocation," 3GPP TSG-RAN WG 2#53, R2-061129, May 8, 2006.

Nokia, "ARQ operation with HARQ-ARQ interaction," 3GPP TSG-RAN WG2 Meeting #55, R2-062765, Oct. 9, 2006.

Ericsson, "Uplink HARQ-ARQ Interactions for NACK -> ACK error," 3GPP TSG-RAN WG2 #56, R2-063238, Nov. 6, 2006.

Samsung, "MAC functions: ARQ," 3GPP TSG-RAN2 Meeting #51, R2-060374, Feb. 13, 2006.

3rd Generation Partnership Project (3GPP); "Technical Specification Group Radio Access Network; Physical Layer Aspects for Evolved UTRA (Release 7)", 3GPP TR 25.814, V1.5.0, May 2006.

* cited by examiner

- PRIOR ART -

- PRIOR ART -

-PRIOR ART -

- PRIOR ART -

- PRIOR ART -

- PRIOR ART -

- PRIOR ART -

METHOD FOR RECEIVING COMMON CHANNEL IN WIRELESS COMMUNICATION AND TERMINAL THEREOF

CROSS-REFERENCE TO RELATED APPLICATIONS

This application is the National Stage filing under 35 U.S.C. §371 of International Application No. PCT/KR2008/000101, filed on Jan. 8, 2008, which claims the benefit of U.S. Provisional Application Ser. Nos. 60/884,009, filed on Jan, 8, 2007, and 60/884,401, filed on Jan. 10, 2007.

TECHNICAL FIELD

The present invention relates to wireless (mobile) communications, and more particularly, to a method for receiving a common channel by a mobile terminal from a radio network, and a terminal implementing such method.

BACKGROUND ART

FIG. 1 illustrates an exemplary basic structure of a UMTS (Universal Mobile Telecommunications System) network according to the present invention and the related art. The UMTS includes a terminal (user equipment (UE)), a UTRAN (UMTS Terrestrial Radio Access Network), and a core network (CN). The UTRAN includes one or more radio network sub-systems (RNSs). Each RNS includes a radio network controller (RNC) and a plurality of base stations (Node-Bs) managed by the RNC. One or more cells exist for a single Node B.

FIG. 2 illustrates a radio interface protocol architecture based on a 3GPP radio access network specification between the UE and the UTRAN. As shown in FIG. 2, the radio interface protocol has horizontal layers comprising a physical layer, a data link layer, and a network layer, and has vertical planes comprising a user plane (U-plane) for transmitting data information and a control plane (C-plane) for transmitting control signals (signaling). The protocol layers in FIG. 2 can be divided into a first layer (L1), a second layer (L2), and a third layer (L3) based on three lower layers of an open system interconnection (OSI) standard model widely known in communication systems.

Each layer in FIG. 2 will be described in more detail as follows. The first layer (L1), namely, the physical layer, provides an information transfer service to an upper layer by using a physical channel. The physical layer is connected to an upper layer called a medium access control (MAC) layer via a transport channel. Data is transferred between the MAC layer and the physical layer via the transport channel. Meanwhile, between different physical layers, namely, between a physical layer of a transmitting side and that of a receiving side, data is transferred via the physical channel.

The MAC layer of the second layer provides a service to a radio link control (RLC) layer, its upper layer, via a logical channel. The RLC layer of the second layer may support reliable data transmissions and perform segmentation and concatenation on RLC service data units (SDUs) delivered from an upper layer.

A radio resource control (RRC) layer located at the lowest portion of the third layer is defined only in the control plane, and handles the controlling of transport channels and physical channels in relation to establishment, reconfiguration and release of radio bearers (RBs). The radio bearer refers to a service provided by the second layer (L2) for data transmission between the terminal and the UTRAN. In general, establishing the radio bearer refers to defining the protocol layers and the characteristics of the channels required for providing a specific service, and setting respective substantial parameters and operation methods.

When an RRC layer of a particular terminal and that of the UTRAN are connected to exchange an RRC message to each other, the corresponding terminal is in an RRC connected state, and when the RRC layer of the particular terminal and that of the UTRAN are not connected, the corresponding terminal is in an idle state. The RRC connected state of the terminal may be divided into a URA_PCH state, a CELL_PCH state, a CELL_FACH state, and a CELL_DCH state. In order to reduce power consumption, terminals in the idle state, in the URA_PCH or in the CELL_PCH state discontinuously receive a PICH (Paging indicator Channel), a physical channel, and an SCCPCH (Secondary Common Control Physical Channel), a physical channel, to which a PCH (Paging Channel), a transport channel, is mapped, by using a DRX (Discontinuous Reception) method. During other time intervals than the time duration while the PICH or the SCCPCH is received, the terminal is in a sleeping mode. In the related art, the terminal performing the DRX method wakes up at every CN domain specific DRX cycle length or at every UTRAN specific DRX cycle length to receive a terminal-exclusive PI (Paging Indicator). Here, the terminal-exclusive PI in the related art is used to inform a particular terminal that a paging message will be transmitted to the particular terminal via the PCH channel. The PICH channel is divided into 10 ms-long PICH frames, and a single PICH frame consists of 300 bits. The first 288 bits of a single frame are used for the terminal-exclusive PICH to transmit one or more terminal-exclusive PIs. The rear 12 bits of the single PICH frame are not transmitted. For the sake of convenience, the portion of the front 288 bits of the PICH channel is defined as a UE PICH, and the portion of the rear 12 bits is defined as a PICH unused part.

FIG. 3 is a signal flow chart illustrating an RRC connection procedure between the terminal and the UTRAN according to the related art. As shown in FIG. 3, in order for the terminal in the idle state to be RRC-connected with the UTRAN, the terminal should perform an RRC connection procedure. The RRC connection procedure may include three steps: transmitting, by the terminal, an RRC connection request message to the UTRAN (S1); transmitting, by the UTRAN, an RRC connection setup message to the terminal (S2); and transmitting, by the terminal, an RRC connection setup complete message to the UTRAN (S3).

An HS-DSCH transmission for transmitting high speed data to a single terminal via the downlink in the related art will now be described. The HS-DSCH has a 2 ms transmission time interval (TTI) (3 slots) and supports various modulation code sets (MCSs) to obtain a high data rate. An optimum throughput may be achieved by selecting an MCS which is most suitable for a channel situation. For this, a hybrid automatic repeat request (HARQ) technique that combines an ARQ technique and a channel coding technique can be employed to perform reliable transmissions.

FIG. 4 illustrates a protocol stack of the HS-DSCH according to the related art. As shown in FIG. 4, a data unit transferred from an RLC layer of an SRNC is delivered to a MAC-d entity that manages a dedicated channel via a DlCH or a DCCH, a logical channel, and the corresponding data is transferred to a MAC-hs of a Node B via a MAC-c/sh/m of an CRNC. Here, the MAC-d is a MAC entity that manages the dedicated channel, the MAC-c/sh/m is a MAC entity that manages a common channel, and a MAC-hs is a MAC entity that manages the HS-DSCH.

A physical channel HS-PDSCH is used to transmit the transport channel HS-DSCH. The HS-PDSCH has a fixed 16 spreading factor and corresponds to a channelization code selected from a set of channelization codes reserved for HS-DSCH data transmission. If a multi-code transmission is performed with respect to a single UE, a plurality of channelization codes are allocated during the same HS-PDSCH sub-frame. FIG. 5 illustrates a sub-frame and slot structure of the HS-PDSCH. The HS-PDSCH transmits QPSK or 16 QAM modulation symbols. In FIG. 5, 'M' indicates the number of bits per modulation symbol. Namely, in case of QPSK, 'M' is 2, and in case of 16QAM, 'M' is 4.

FIG. 6 illustrates a channel configuration according to the related art.

As shown in FIG. 6, in order to transmit user data via the HS-DSCH, HS-DSCH control information needs to be transmitted, and in this case, the HS-DSCH control information is transmitted via a downlink HS-SCCH (High Speed-Shared Control Channel) and an uplink HS-DPCCH (High Speed-Dedicated Physical Control Channel). Here, a DPCH (Dedicated Physical Channel) is a bi-directional physical channel, to which the transport channel DCH is mapped, and is used to transfer terminal-exclusive data and terminal-exclusive L1 control information such as a power control signal required for controlling closed-loop power. In addition, an F-DPCH (Fractional Dedicated Physical Channel), a downlink channel, is a physical channel that transmits several DPCHs by using a single channel code. Here, a single F-DPCH does not transmit terminal-exclusive (or terminal dedicated) data of several terminals but is used to transfer terminal-exclusive L1 control information of several terminals, such as the power control signal required for controlling the closed-loop power, together. If there is a downlink F-DPCH channel, an uplink DPCH channel also operates in conjunction. In FIG. 6, a UE1, a UE2 and a UE3 use the F-DCPH via a single channel code and, in this case, each terminal provides the DPCH upwardly.

The downlink HS-SCCH, a downlink physical channel, is transmitted with a spreading factor 128 and has a 60-kbps transfer rate. FIG. 7 illustrates a sub-frame structure of the HS-SCCH. Information transmitted via the downlink HS-SCCH may be roughly divided into transport format and resource related information (TFRI) and HARQ-related information, and in addition, UE identifier (namely, an H-RNTI (HS-DSCH Radio Network Temporary Identifier)) information for providing information about a particular user is masked thereto and then transmitted. Table 1 shows detailed HS-SCCH information.

TABLE 1

| TFRI information | |
|---|---|
| Channelization-code-set information (7 bits) | xccs, 1, xccs, 2 ... Xccs, 7 |
| Modulation scheme information (1 bit) | xms, 1 |
| Transport-block size information (6 bits) | Xtbs, 1, xtbs, 2, ... Xtbs, 6 |
| HARQ information | |
| Hybrid-ARQ process information (3 bits) | xhap, 1, xhap, 2, xhap, 3 |
| Redundancy and constellation version (3 bits) | xrv, 1, xrv, 2, xrv, 3 |
| New data indicator (1 bit) | xnd, 1 |
| UE ID information | |
| UE identity (16 bits) | xue, 1, xue, 2, ... xue, 16 |

FIG. 8 shows a coding scheme of the HS-SCCH based on the above information.

The uplink HS-DPCCH transmits an uplink feedback signaling related to downlink HS-DSCH data transmission. The HS-DPCCH, a dedicated channel for a particular terminal, operates cooperatively with the uplink and downlink DPCHs. The feedback signaling includes ACK (Acknowledgement)/NACK (Negative Acknowledgement) information for the HARQ and a CQI (Channel Quality Indicator). A frame of the HS-DPCCH includes five sub-frames. Each sub-frame has a length of 2 ms, and a single sub-frame includes the first to third slots, namely, the three slots. Each slot of the sub-frames carries the following information: HARQ ACK/NACK information is transmitted on the first slot of the sub-frames of the HS-DPCCH; and the CQI is transmitted on the second and third slots of the sub-frames of the HS-DSCH. The HS-DPCCH is transmitted always together with an uplink PDCCH. The CQI transfers status information of a downlink radio channel obtained from the results of the UE's measurement of a downlink CPICH (Common Pilot Channel), and the ACK/NACK provides ACK or NACK information regarding a user data packet which has been transmitted via the downlink HS-DSCH according to the HARQ mechanism. FIG. 9 illustrates a frame structure of the uplink HS-DPCCH.

The problem to be solved by the present invention is as follows.

In the related art, when the terminal is in the CELL_DCH state, the terminal can receive the HS-DSCH. Meanwhile, if the terminal is in the CELL_FACH, the CELL_PCH, the URA_PCH or idle state, besides the CELL_DCH state, the terminal cannot receive the HS-DSCH but receive the FACH or the PCH which is mapped to the SCCPCH. In this respect, however, compared with the HS-DSCH, AMC (Adaptive Modulation and Coding) cannot be applied for the FACH and the PCH, so in terms of efficiency of radio resources, the FACH and the PCH are considered to be inefficiently used channels.

Thus, in the related art, in order to apply the AMC in other states (namely, CELL_FACH, the CELL_PCH, the URA_PCH and idle mode states) than the CELL_DCH state, AMC information should be added to a TFCI (Transport Format Combination Indicator) that transfers control information for the FACH and the PCH. This, however, causes a problem in that the related art terminal cannot recognize the TFCI.

Technical Gist of the Present Invention

Therefore, it is an object of the present invention to provide a method for enhancing efficiency of radio resources by allowing a terminal to recognize an AMC (Adaptive Modulation and Coding)-applied FACH and PCH in other states (namely, CELL_FACH, CELL_PCH, URA_PCH, and idle mode states) than a CELL_DCH state. Namely, the object of the present invention is to provide a method in which AMC information is added to control information for the FACH and the PCH even in other states namely, CELL_FACH, CELL_PCH, URA_PCH, and idle mode states) than the CELL_DCH state, and the terminal can recognize the FACH and the PCH according to the added AMC information (namely, control information)

To achieve the above object, there is provided a method for receiving a common channel between a radio network and a terminal in wireless communication, including: receiving, by the terminal, shared control channel including control information from the radio network; determining whether to receive a shared data channel or a common channel by using the control information; and receiving the shared channel or the common channel according to the control information.

Preferably, the control channel is an HS-SCCH (High Speed-Shared Control Channel).

Preferably, the shared data channel is an HS-DSCH (High Speed-Dedicated Shared Channel), the common channel is an FACH or a PCH, and the control information includes AMC information.

Preferably, control information for receiving the shared data channel and control information for receiving the common channel are transmitted on the shared control channel in a time-division manner.

To achieve the above object, there is also provided a terminal including: receiving unit that receives a control channel from a radio network; and a processing unit that determines whether to receive a shared data channel or a common channel by using control information delivered by the control channel.

To achieve the above object, there is also provided a method for receiving a common channel between a radio network and a terminal in wireless communication, including: receiving, by the terminal, an HS-SCCH from the radio network; discriminating, by the terminal, an FACH and an HS-FACH by using control information transmitted on the HS-SCCH; and receiving, by the terminal, the FACH or the HS-FACH according to the control information.

Preferably, the method further includes: performing time division multiplexing on the HS-FACH and the FACH according to the control information and transmitting the same from the radio network to the terminal.

Preferably, the control information includes AMC information.

To achieve the above object, there is also provided a method for receiving a common channel between a radio network and a terminal in wireless communication, including: receiving, by the terminal, an HS-SCCH from the radio network; discriminating, by the terminal, a PCH or an HS-PCH by using control information transmitted on the HS-SCCH; and receiving, by the terminal, the PCH or the HS-PCH according to the control information.

According to the present invention, the mobile terminal receives a shared control channel, determines whether to receive a shared data channel or a common channel, and receives the shared data channel or the common channel according to control information delivered by the shared control channel, thus effectively using radio resources.

MODE FOR CARRYING OUT THE PREFERRED EMBODIMENTS

The present invention is applied for a UMTS communication system, communication device and communication method that can transmit data between a mobile terminal and a radio network. However, the present invention is not limited as such, and may be applicable to any wired/wireless communication technique.

The basic concept of the present invention is that 1) a mobile terminal receives a shared control channel (HS-SCCH) from a radio network; 2) the mobile terminal determines whether to receive a shared data channel (HS-DSCH) or a common channel (an FACH or a PCH); and 3) the mobile terminal receives the shared data channel or the common channel according to control information (control information including AMC information) transmitted by the shared control channel. In this case, control information (will be called 'first control information' for the sake of convenience) for receiving the shared data channel and control information (will be called 'second control information' for the sake of convenience) for receiving the common channel are transmitted on the shared control channel in a time-division manner.

The terms and channel characteristics used in the description of the present invention will be explained as follows.

In the present invention, like the HS-DSCH, the HS-FACH and the HS-PCH correspond to transport channels and are mapped to a physical channel HS-PDSCH so as to be transmitted. Like the HS-DSCH, the HS-FACH and the HS-PCH are available for AMC (Adaptive Modulation and Coding) and time-division-multiplexed together with the HS-DSCH so as to be transmitted.

The HS-FACH and HS-PCH defined in the present invention are discriminated from the FACH and the PCH. Namely, the FACH and the PCH are the related art transport channels that are mapped to the related art physical channel SCCPCH and transmitted.

The terminal according to the present invention refers to a terminal (or device) that supports the techniques of the present invention and is discriminated from the related art terminal that does not support the techniques of the present invention. In describing the present invention, if the term 'related art terminal' is not designated, the terminal presented in the description of the present invention will indicate the terminal that supports the techniques of the present invention.

The configuration and operation of the present invention will now be described with reference to FIGS. 10 to 12.

Figure 1:
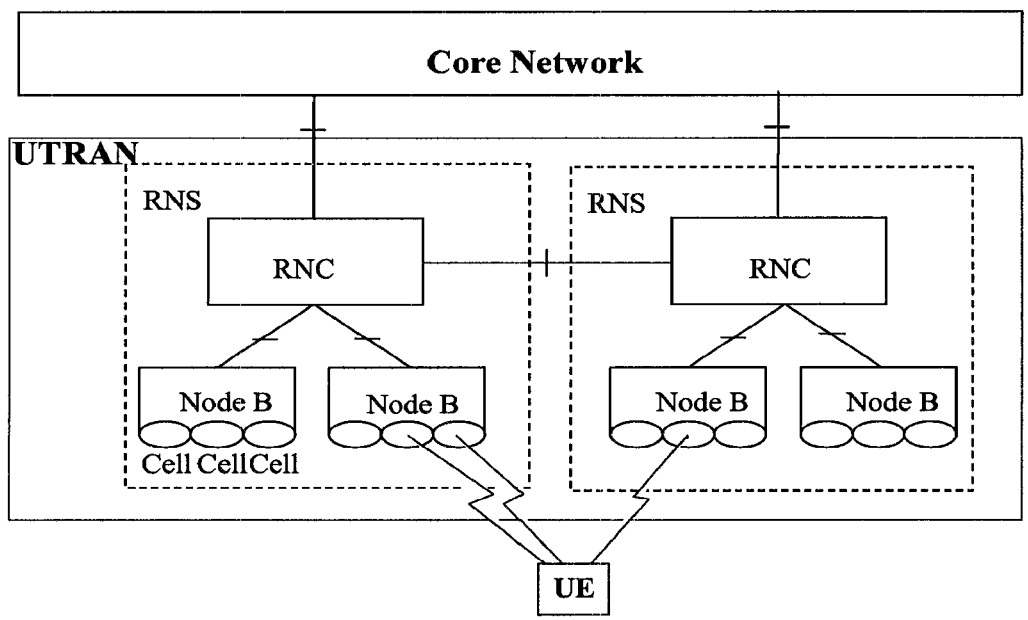
FIG. 1 illustrates an exemplary basic structure of a UMTS network according to the present invention and the related art.
Figure 2:
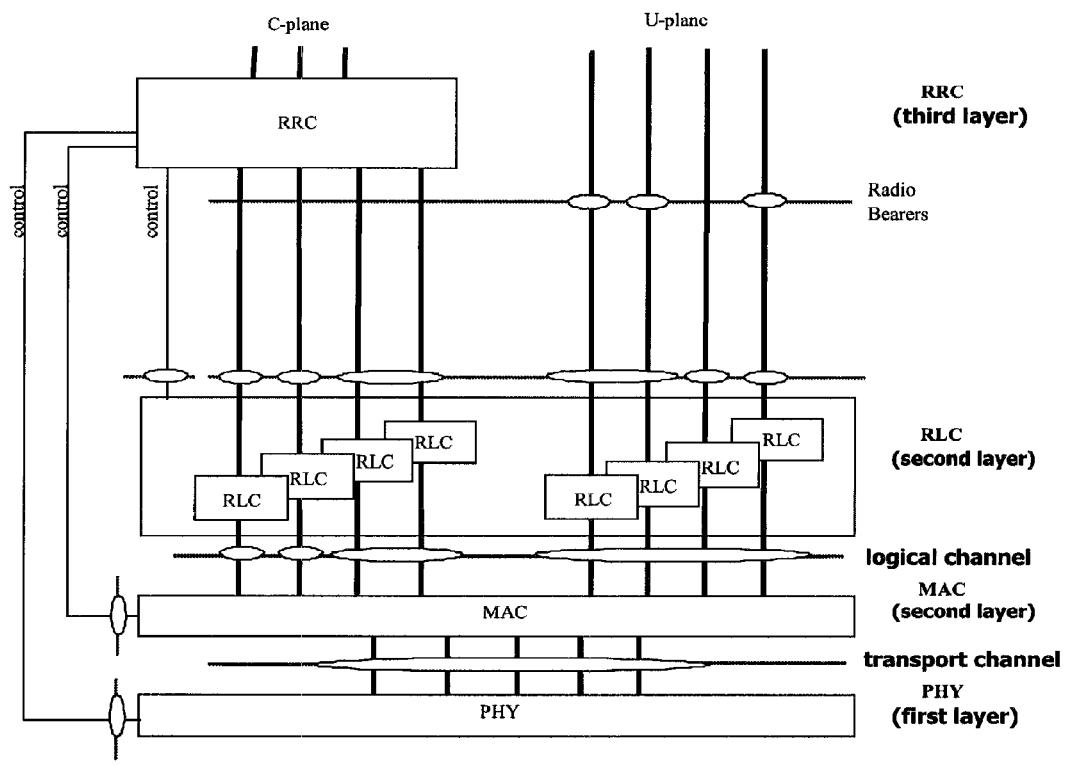
FIG. 2 illustrates a radio interface protocol architecture based on a 3GPP radio access network specification between a terminal and a UTRAN.
Figure 3:
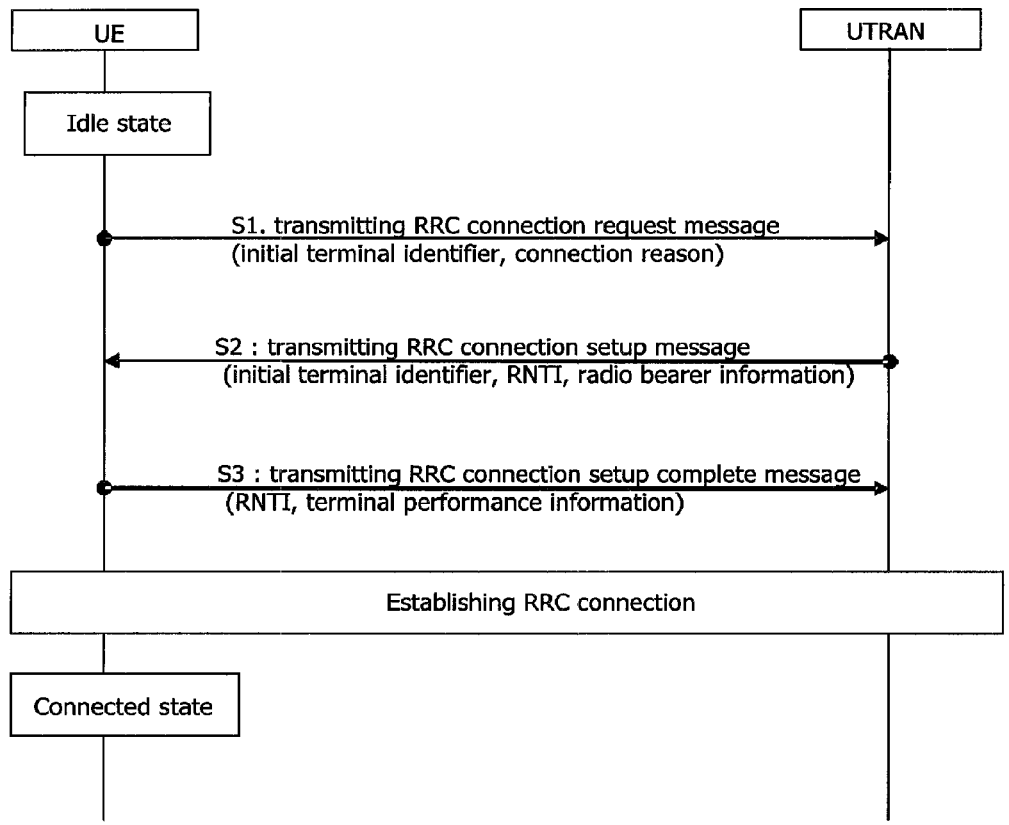
FIG. 3 is a signal flow chart illustrating an RRC connection procedure between the terminal and the UTRAN according to the related art.
Figure 4:
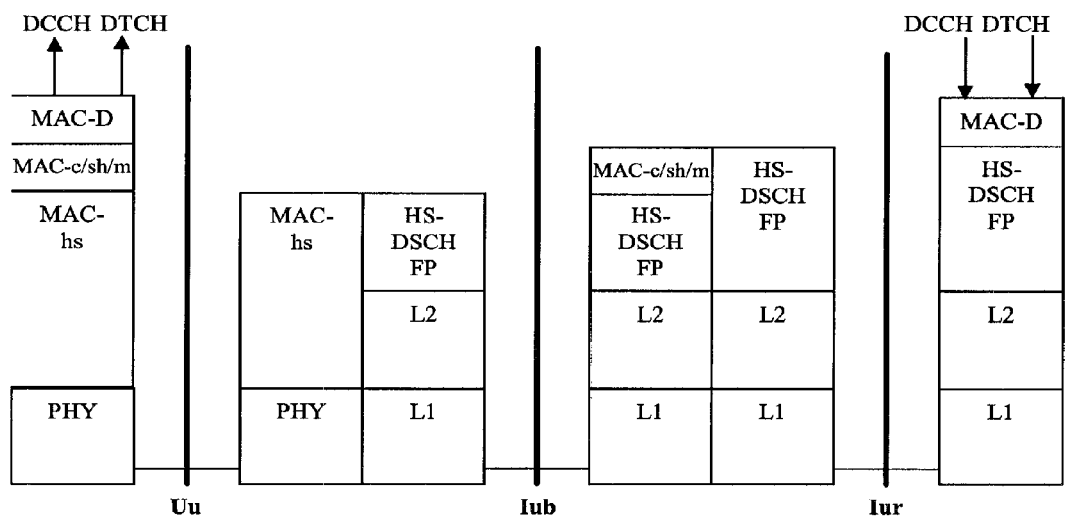
FIG. 4 illustrates a protocol stack of an HS-DSCH according to the related art.
Figure 5:
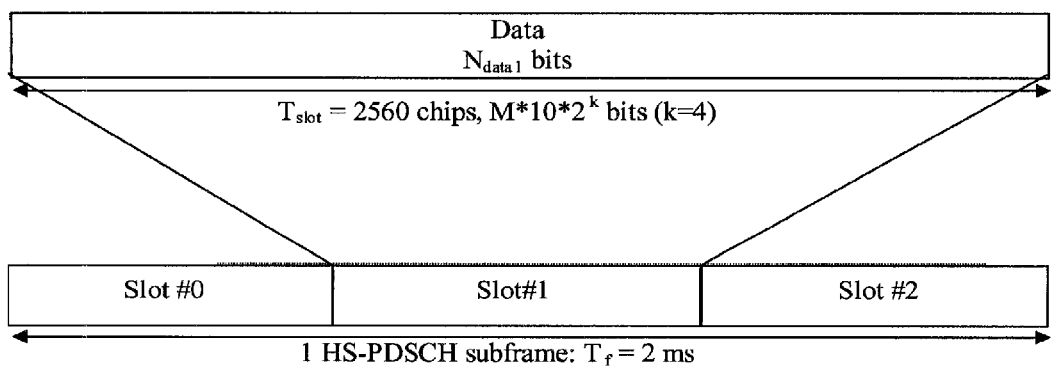
FIG. 5 illustrates a sub-frame and slot structure of the HS-PDSCH.
Figure 6:
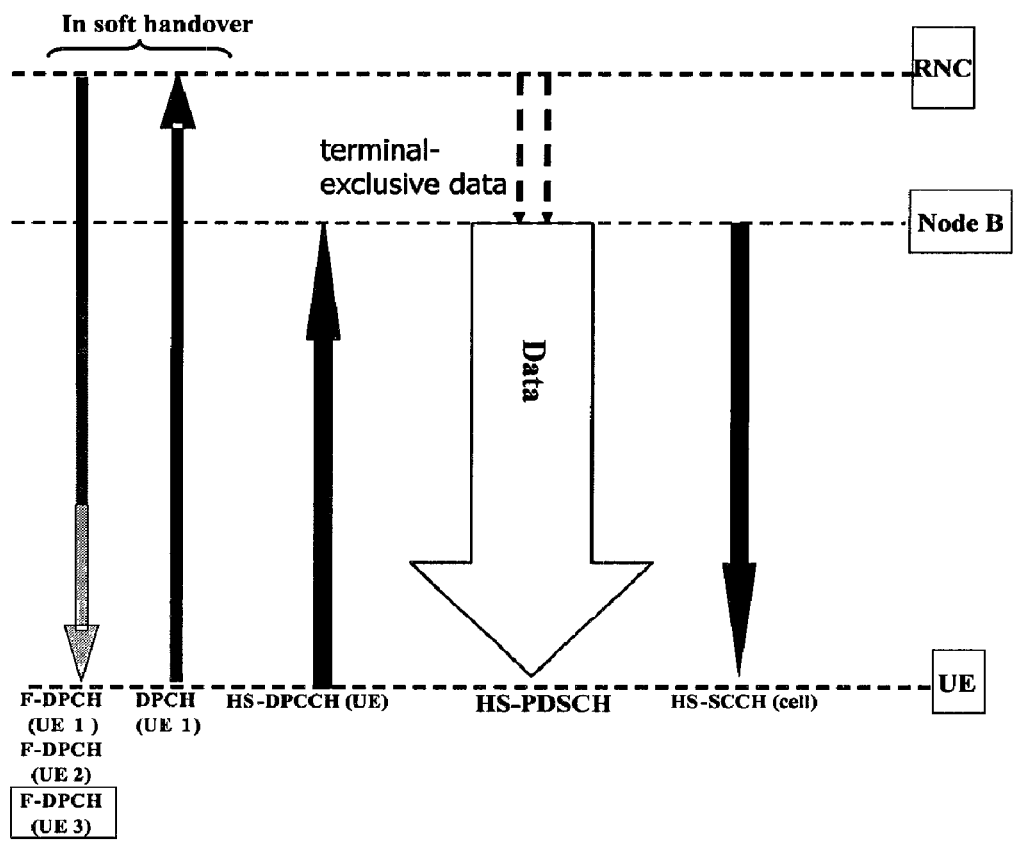
FIG. 6 illustrates a channel configuration according to the related art.
Figure 7:
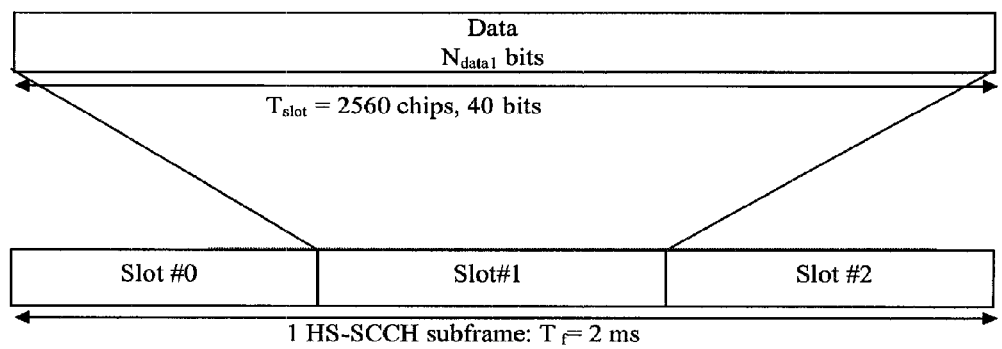
FIG. 7 illustrates a sub-frame structure of an HS-SCCH.
Figure 8:
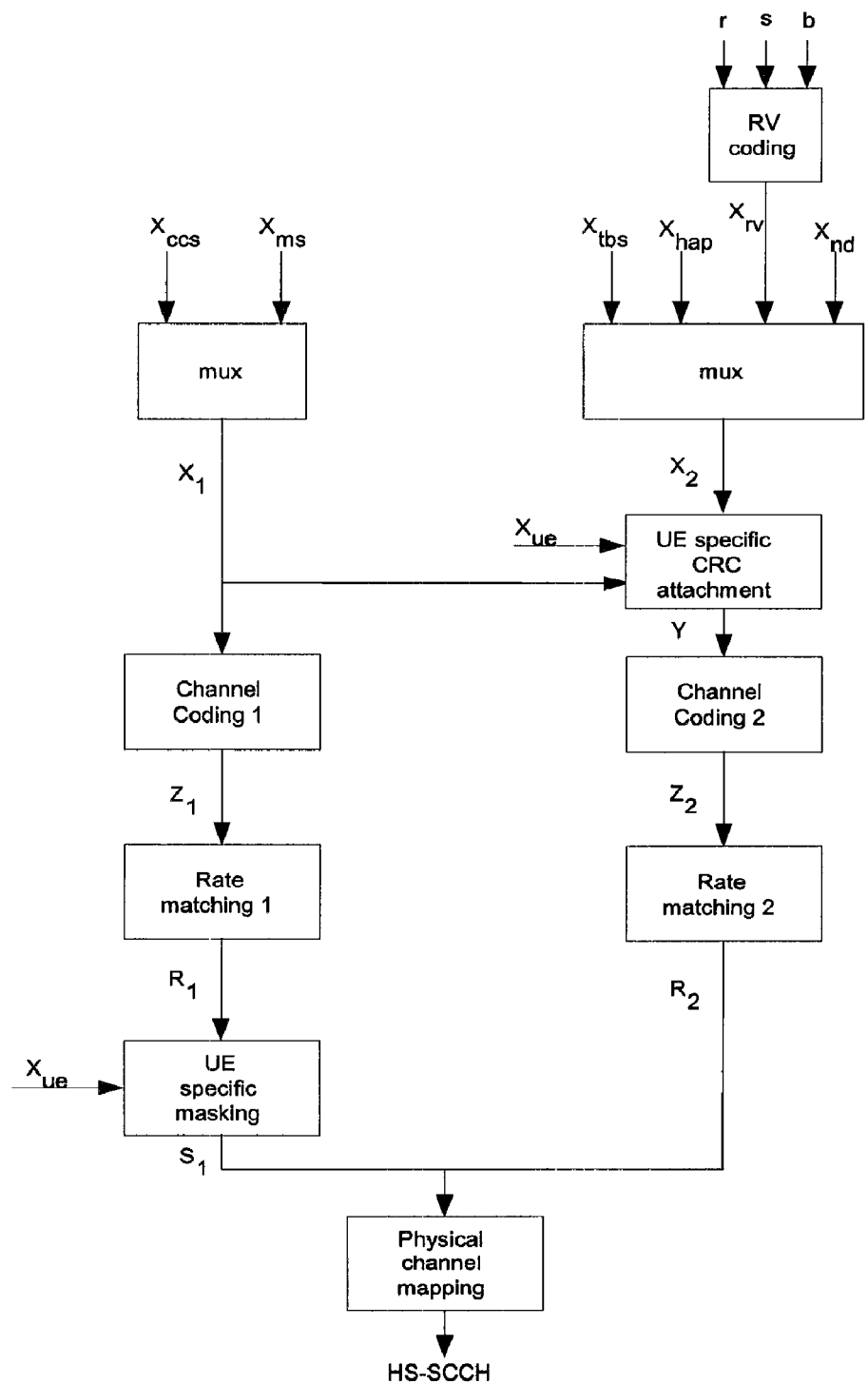
FIG. 8 shows a coding scheme of the HS-SCCH.
Figure 9:
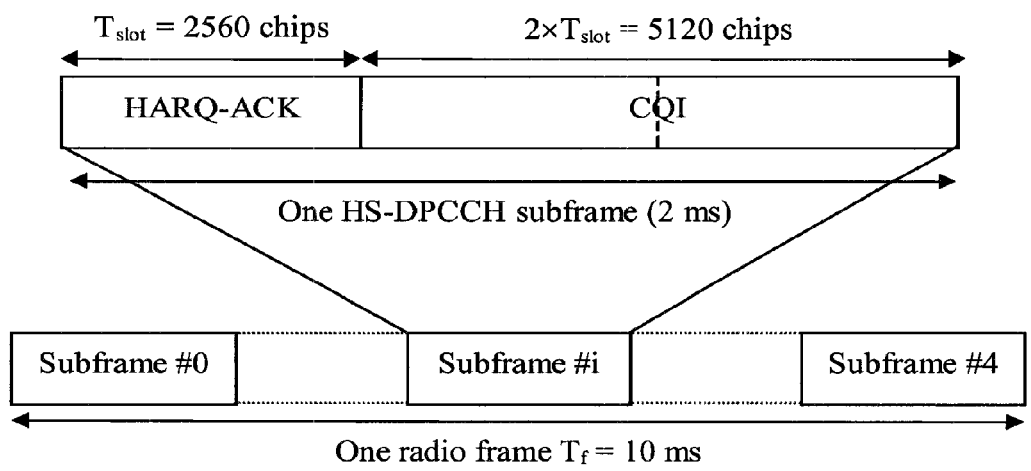
FIG. 9 illustrates a frame structure of an uplink HS-DPCCH.
Figure 10:
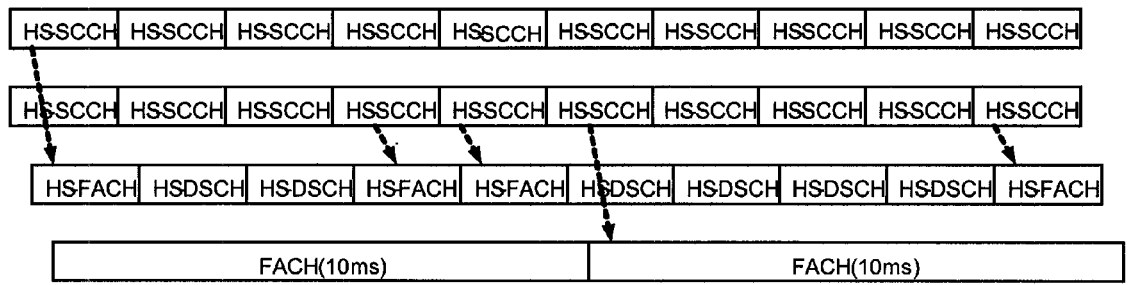
FIG. 10 shows a first embodiment of the present invention.

FIG. 10 shows a first embodiment of the present invention. An H-RNTI (namely, a terminal identifier or a UE ID) of the HS-SCCH is used to indicate transmission of the HS-FACH or the related art FACH. The terminal can discriminate the FACH and the HS-FACH based on control information transmitted by the HS-SCCH. Accordingly, after receiving the shared control channel HS-SCCH, the terminal receives the FACH or the HS-FACH according to the control information.

A base station may transmit data to the terminal via the FACH or the HS-FACH. When the base station transmits data to the terminal, it handles a function of scheduling the FACH or the HS-FACH.

With reference to FIG. 10, if a logical channel CTCH or MBMS-related data is transmitted via the FACH, the base station cannot handle scheduling.

In order to simultaneously receive the CTCH or the MBMS-related data, the terminal according to the present invention should simultaneously receive the HS-FACH and the FACH. Otherwise, the terminal according to the present invention, which is in the CELL_FACH state, may receive only the HS-FACH.

If the terminal is to receive the FACH, the terminal receives the HS-SCCH and then receives the FACH by using control information transferred by the received HS-SCCH. Thus, the terminal does not need to receive control information via a TFCI transmitted by an SCCPCH to which the FACH is mapped. For this reason, when the FACH is transmitted to the terminal, if the SCCPCH transmits the FACH, a radio network does not need to transmit the TFCI together. Meanwhile, the related art terminal receives only the FACH, without receiving the HS-SCCH, if it is in the CELL_FACH state.

As shown in FIG. 10, in the first embodiment of the present invention, the HS-FACH is time-division-multiplexed together with the HS-DSCH, and its TTI (Transmission Time Interval) has a length of 2 ms, the same as that of the HS-DSCH.

Figure 11:
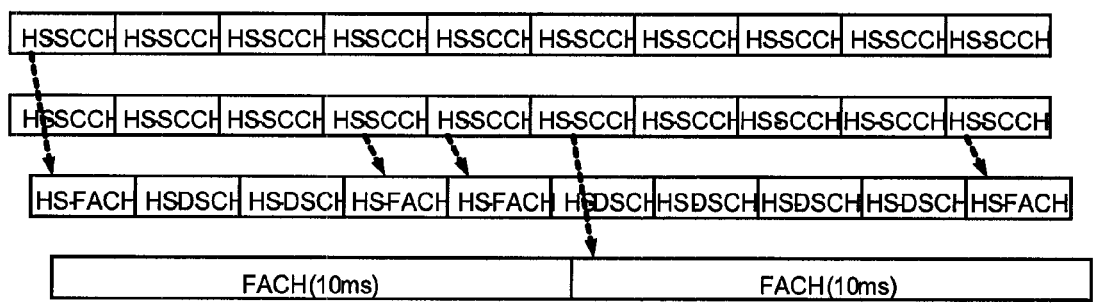
FIG. 11 shows a second embodiment of the present invention.

FIG. 11 shows a second embodiment of the present invention.

In the second embodiment of the present invention, the HS-FACH may be time-division multiplexed with the related art FACH and transmitted. In this case, the HS-FACH which is time-division multiplexed and transmitted with the FACH has a 10-ms TTI.

The terminal receives the HS-SCCH and can know the TTI of the HS-FACH by using the control information transferred by the HS-SCCH. After receiving the HS-SCCH, the terminal receives the FACH or the HS-FACH according to the control information.

Figure 12:
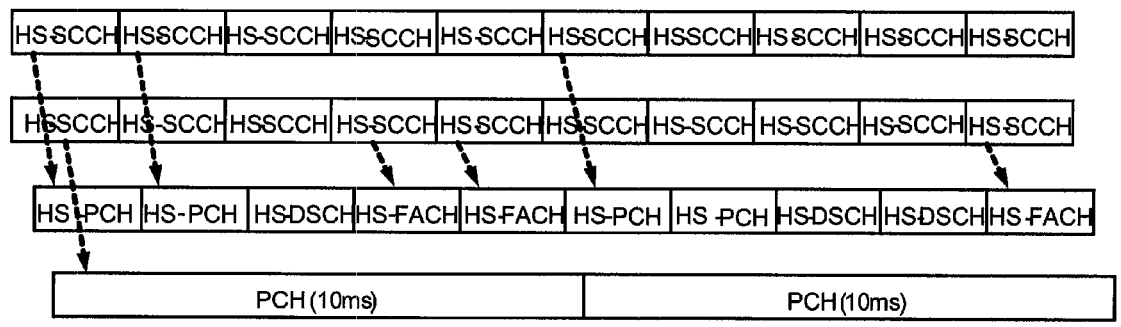
FIG. 12 shows a third embodiment of the present invention.

FIG. 12 shows a third embodiment of the present invention.

In the third embodiment, the HS-PCH is a transport channel mapped to the HS-PDSCH, like the HS-FACH does, and is used to transmit a call message.

The terminal receives the HS-SCCH and can know control information of the PCH or the HS-PCH by using control information transferred by the HS-SCCH. After receiving the HS-SCCH, the terminal receives the PCH or the HS-PCH according to the control information. The HS-SCCH informs the terminal that whether the terminal should receive the PCH or the HS-PCH.

Figure 13:
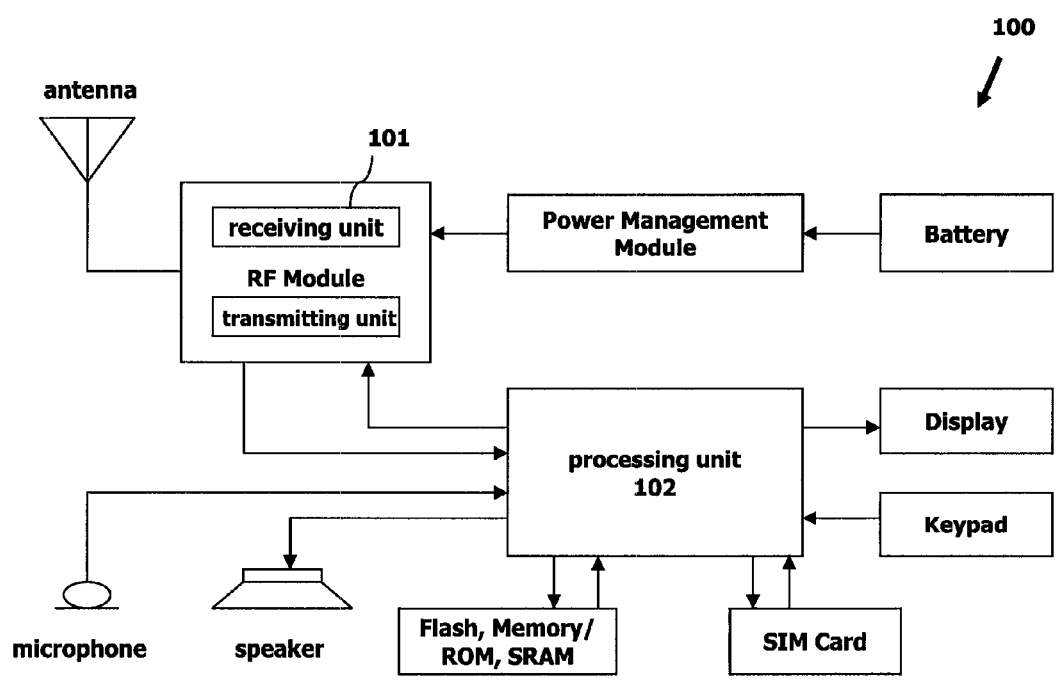
FIG. 13 is a schematic block diagram of a terminal according to an embodiment of the present invention.

FIG. 13 is a schematic block diagram of a terminal according to an embodiment of the present invention.

The configuration and operation of the terminal according to an embodiment of the present invention will now be described with reference to FIG. 13.

The terminal 100 according to an embodiment of the present invention includes any terminal used for mobile communications (e.g., UEs, mobile phones, cellular phones, DMB phones, DVB-H phones, PDA phones, PTT phones, etc), digital TVs, GPS navigation, mobile game devices, MP3s, home appliances, and the like. That is, the mobile terminal 100 comprehensively includes any device to which the technical idea of the present invention can be applicable.

The terminal according to the present invention includes: a receiving unit 101 that receives the control channel (HS-SCCH) from the radio network (UTRAN); and a processing unit 102 that determines whether to receive the shared data channel (HS-DSCH) or the common channel (FACH or PCH) by using control information transferred by the control channel.

The receiving unit 101 receives the shared data channel or the common channel according to determination by the processing unit 102 based on the control information. Here, the control information refers to information that includes AMC information.

The processing unit 102 may be called a controller and the meaning of the name of the processing unit does not limit a function and operation of the configuration. The receiving unit 101 may be called an RF module.

Besides the basic elements as shown in FIG. 13, the terminal 100 according to the embodiment of the present invention includes all the basic elements requisite for the terminal to apply the technique of the present invention. As such, the detailed description of certain elements shown in FIG. 13 and other related elements that can be understood by those skilled in the art are omitted merely for the sake of brevity.

The invention being thus described, it will be obvious that the same may be varied in many ways. Such variations are not to be regarded as a departure from the scope of the invention, and all such modifications as would be obvious to one skilled in the art are intended to be included within the scope of the following claims.

The invention claimed is:

1. A method for receiving a common channel between a radio network and a terminal in wireless communication, the method comprising:
   receiving, by the terminal, an HS-SCCH (High Speed-Shared Control Channel) from the radio network;
   discriminating, by the terminal, an FACH (Forward Access Channel) and an HS-FACH by using control information transmitted on the HS-SCCH; and
   receiving, by the terminal, the FACH or the HS-FACH according to the control information;
   wherein the control information comprises a High Speed-Dedicated Shared Channel (HS-DSCH) Radio Network Temporary Identifier (H-RNTI).

2. The method of claim 1, further comprising:
   performing time division multiplexing on the HS-FACH and the FACH according to the control information and transmitting the same from the radio network to the terminal.

3. The method of claim 1, wherein the control information comprises AMC (Adaptive Modulation and Coding) information.

4. A method for receiving a common channel between a radio network and a terminal in wireless communication, the method comprising:
   receiving, by the terminal, an HS-SCCH (High Speed-Shared Control Channel) from the radio network;
   discriminating a PCH (Paging Channel) and an HS-PCH by using control information transmitted on the HS-SCCH; and
   receiving, by the terminal, the PCH or the HS-PCH according to the control information;
   wherein the control information comprises a High Speed-Dedicated Shared Channel (HS-DSCH) Radio Network Temporary Identifier (H-RNTI).

5. The method of claim 4, wherein the control information comprises AMC (Adaptive Modulation and Coding) information.

* * * * *